H. J. AREND.
WHEEL RIM.
APPLICATION FILED SEPT. 22, 1914.
1,169,908.
Patented Feb. 1, 1916.
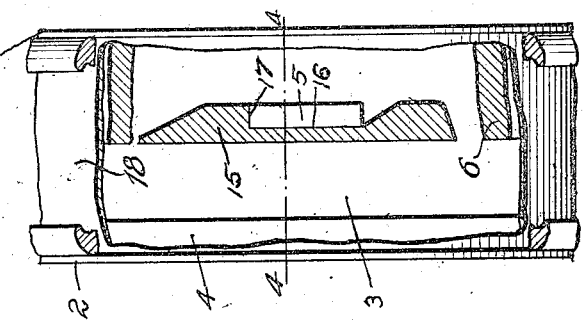
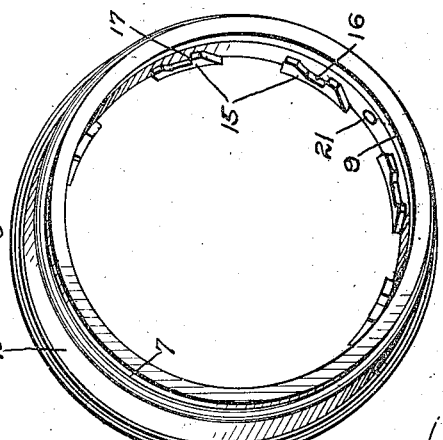
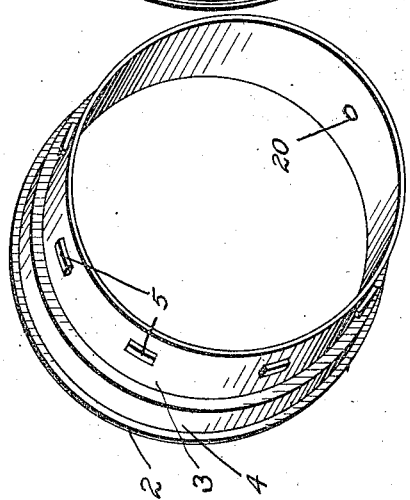
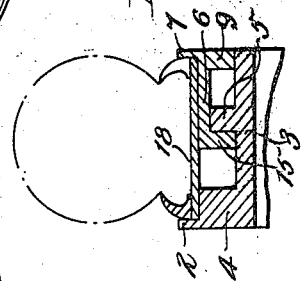
Witnesses
John K. Phillips
M. Neff
Inventor
Henry J. Arend
By Robert H. Young
Attorney

UNITED STATES PATENT OFFICE.

HENRY J. AREND, OF QUINCY, ILLINOIS.

WHEEL-RIM.

1,169,908.  Specification of Letters Patent.  Patented Feb. 1, 1916.

Application filed September 22, 1914. Serial No. 862,905.

*To all whom it may concern:*

Be it known that I, HENRY J. AREND, a citizen of the United States, residing at Quincy, in the county of Adams and State of Illinois, have invented new and useful Improvements in Wheel-Rims, of which the following is a specification.

This invention relates to wheels, and pertains more particularly to that type of wheels in which the pneumatic tire is readily removable therefrom, a section of the wheel being adapted to carry the tire which is detachably secured in place thereon by a removable section of the wheel.

In the accompanying drawings, in which like reference characters indicate similar parts, Figure 1 is a perspective view of the main section or body portion of my wheel rim; Fig. 2 is a similar view of the tire-carrying section thereof; Fig. 3 is a detail view showing the means for locking the tire-carrying ring to the body portion of the wheel, and Fig. 4 is a sectional view of my wheel rim taken on the line 4—4 of Fig. 3.

Referring more particularly to the drawings, the reference numeral 1 designated the main section of the wheel rim which is provided on its outer periphery with an annular flange 2, this flange being provided on one side of the body portion 3 only. The flange 2 is provided with a shoulder 4, the purpose of which will be described hereinafter. On the body portion 3 of the main section 1 are a plurality of circumferentially arranged lugs 5, said lugs being substantially of oblong shape, and spaced equidistant apart.

The tire-carrying member comprises a ring 6 having an annular shoulder 7 on one side of its outer periphery, and an annular flange 9 on its inner periphery, the purpose of each of which will be hereinafter set forth. On the inner periphery of the tire-carrying member are a plurality of lugs 15, one edge of which lies flush with the outer edge of the ring as shown. The inner edges of said lugs are provided with recesses 16, and each extremity of the lugs is beveled, and a straight portion 17 connects the beveled extremities with the recessed portion. Surrounding the outer periphery and of greater width than the same, is secured a band 18, adapted to carry the tire-holding rings.

The main section is provided with a circular opening 20, and the tire-carrying member is also provided with an opening 21, which openings are adapted to be brought into register when the parts are assembled to permit the projection of the valve stem of the inner tube of the tire.

In assembling the parts, the tire together with its casing is positioned on the tire carrying member 6, the valve stem of the inner tube being passed through the aforementioned circular opening 21. After the tire has been positioned on the tire-carrying member 6, the latter is positioned with the spaces between the lugs 15 opposite the lugs 5 on the outer periphery of the main section 1, and the tire-carrying member is then forced over the main section 1. When the parts are in the positions described, the circular ring or band 18 rests against the shoulder of the main section 1, this shoulder 4, forming the support for the free edge thereof. After the parts have been thus far assembled, the tire carrying member is moved circumferentially around the main section 1 until the lugs 5 thereon engage in the recesses of the lugs 15 on the tire-carrying member whereupon the tire carrying member 6 is held in place, and is secured therein by the expansive pressure of the tire when inflated.

When it is desired to remove the tire-carrying member, it is only necessary to turn the same until the lugs 15 thereon register with the spaces between the lugs 5 on the main section whereupon it may be readily removed.

The construction and operation of my device will be readily understood from the foregoing description and by reference to the accompanying drawings, and it will be appreciated that the parts and combinations thereof may be varied within the scope of the claim without departing from the spirit of the invention.

Having thus described my invention, what I claim as new and desire to be secured by Letters Patent, is—

A wheel rim, comprising a main section, a plurality of radial lugs on the face thereof, a tire-carrying ring adapted to telescope said main section when assembled, means for securing a tire thereon, a plurality of elongated lugs on the inner face of the ring, the inner edge of each of which is provided with a recess intermediate of its ends and which edge is beveled at one end, the lugs on the main section being adapted to pass between the lugs on the ring in assembling and separating the parts and to be seated in said recesses to lock the tire-carrying ring on the main section and to be held therein by the expansive pressure of a tire.

HENRY J. AREND.

Witnesses:
H. M. Swope,
Alma A. Swope.